US009076017B2

(12) United States Patent
Addepalli et al.

(10) Patent No.: US 9,076,017 B2
(45) Date of Patent: Jul. 7, 2015

(54) HARDWARE VIRTUALIZATION MODULE FOR EXCLUSIVE CONTROLLED ACCESS TO CPU

(71) Applicant: Cisco Technology, Inc., San Jose, CA (US)

(72) Inventors: Sateesh K Addepalli, San Jose, CA (US); Raghuram S Sudhaakar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/091,485

(22) Filed: Nov. 27, 2013

(65) Prior Publication Data

US 2015/0150118 A1 May 28, 2015

(51) Int. Cl.
*H04L 29/06* (2006.01)
*G06F 21/00* (2013.01)
*G06F 21/70* (2013.01)
*G06F 12/14* (2006.01)

(52) U.S. Cl.
CPC .............. *G06F 21/70* (2013.01); *G06F 12/145* (2013.01)

(58) Field of Classification Search
CPC ................................ G06F 21/70; G06F 12/145
See application file for complete search history.

(56) References Cited

U.S. PATENT DOCUMENTS

| 5,414,848 | A | * | 5/1995 | Sandage et al. | 718/107 |
|---|---|---|---|---|---|
| 7,120,728 | B2 | | 10/2006 | Krakirian et al. | |
| 2008/0086729 | A1 | | 4/2008 | Kondoh et al. | |
| 2009/0183168 | A1 | * | 7/2009 | Uchida | 718/104 |
| 2011/0314303 | A1 | * | 12/2011 | Shevchenko et al. | 713/190 |
| 2013/0347000 | A1 | * | 12/2013 | Inoue et al. | 718/105 |

FOREIGN PATENT DOCUMENTS

| GB | 2490738 A | | 11/2012 | |
|---|---|---|---|---|
| JP | 03211629 A | * | 9/1991 | ............... G06F 9/46 |
| WO | 2005036405 A1 | | 4/2005 | |

OTHER PUBLICATIONS

Intel, "Hardware-Assisted Virtualization Technology", [online], [retrieved on Nov. 25, 2013]. Retrieved from the Internet: URL: <http://www.intel.com/content/www/us/en/virtualization/virtualization-technology/hardware-assist-virtualization-technology.html>, pp. 1-3.

(Continued)

*Primary Examiner* — Lisa Lewis
(74) *Attorney, Agent, or Firm* — Leon R. Turkevich

(57) ABSTRACT

In one embodiment, a method comprises providing an apparatus having exclusive access to each of one or more central processing units (CPUs) of a computing system and exclusive access to host resources of the computing system; and controlling, by the apparatus, execution of a virtual machine in the computing system based on the apparatus controlling access to any one of the CPUs or any one of the host resources according to prescribed policies for the virtual machine, the prescribed policies maintained exclusively by the apparatus.

20 Claims, 7 Drawing Sheets

(56) References Cited

OTHER PUBLICATIONS

Jin et al., "Secure MMU: Architectural Support for Memory Isolation among Virtual Machines", (2011) [online], [retrieved on Nov. 25, 2013]. Retrieved from the Internet: URL: <http://calab.kaist.ac.kr/~jhuh/papers/jin_hotdep11.pdf>, 6 pages.

Greene, "Intel Trusted Execution Technology", White Paper, (2012) [online]. [retrieved on Nov. 25, 2013]. Retrieved from the Internet: URL: <http://www.intel.com/content/dam/www/public/us/en/documents/white-papers/trusted-execution-technology-security-paper.pdf>, 8 pages.

\* cited by examiner

HARDWARE VIRTUALIZATION MODULE FOR EXCLUSIVE CONTROLLED ACCESS TO CPU

TECHNICAL FIELD

The present disclosure generally relates to monitoring execution of virtual machines by one or more central processing units (CPUs) in a computing system.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

"Virtualization" is a technique for emulating one or more physical machines using software-based executable code, where each emulation is referred to as an instance of a "virtual machine" (VM). One or more virtual machines can be executed by a hypervisor that is executed within a host operating system (OS) such as Linux; the host OS (e.g., Linux) can provide a virtualization infrastructure that optimizes hypervisor operations, for example by providing a kernel-based virtual machine (KVM) that provides improved emulation operations. The hypervisor controls the access by a virtual machine to the one or more CPUs executing the software-based executable code that includes the host OS, the hypervisor, and the virtual machines.

Use of virtual machines exposes the one or more CPUs to attack by flawed ("buggy") or malicious software code executed within any one of the virtual machines, the hypervisor, and/or the host OS. Virtual machines also can threaten native operations in a computing device: for example, a network router device that natively executes network routing operations in a computing network may encounter disastrous network failures if attacked by a virtual machine executed in the network router device.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises providing an apparatus having exclusive access to each of one or more central processing units (CPUs) of a computing system and exclusive access to host resources of the computing system; and controlling, by the apparatus, execution of a virtual machine in the computing system based on the apparatus controlling access to any one of the CPUs or any one of the host resources according to prescribed policies for the virtual machine, the prescribed policies maintained exclusively by the apparatus.

In another embodiment, an apparatus comprises: at least one central processing unit (CPU) interface manager circuit configured for providing exclusive access to each of one or more CPUs of a computing system; and at least one host interface manager circuit configured for providing exclusive access to host resources of the computing system. The CPU interface manager circuit is configured for controlling execution of a virtual machine in the computing system based on the apparatus controlling access to any one of the CPUs or any one of the host resources according to prescribed policies for the virtual machine, the prescribed policies maintained exclusively by the apparatus.

In another embodiment, logic is encoded in one or more non-transitory tangible media for execution by a machine and when executed by the machine operable for: providing the machine with exclusive access to each of one or more central processing units (CPUs) of a computing system and exclusive access to host resources of the computing system; controlling, by the machine, execution of a virtual machine in the computing system based on the machine controlling access to any one of the CPUs or any one of the host resources according to prescribed policies for the virtual machine, the prescribed policies maintained exclusively by the machine.

DETAILED DESCRIPTION

Particular embodiments enable reliable and secure management of virtual machines that can guarantee protection of computing system central processing units (CPUs) from any potential attack by a virtual machine. The particular embodiments provide a hardware-based apparatus that can guarantee protection of the computing system CPUs by isolating the CPUs from any host resource of the computing system. In particular, the hardware-based apparatus physically isolates the CPUs from any host resource such as any memory device of the computing system, or any input/output (I/O) device of the computing system. Further, all software-based instructions are sent to the apparatus based on a "thin" software-based interface containing executable code defining primitives for executing instructions via the apparatus. Hence, all executable operations are passed via the hardware-based apparatus. Moreover, the hardware-based apparatus can either selectively grant access to a CPU and/or an I/O device based on determining whether the access request satisfies prescribed policies maintained exclusively by the apparatus.

Figure 1:
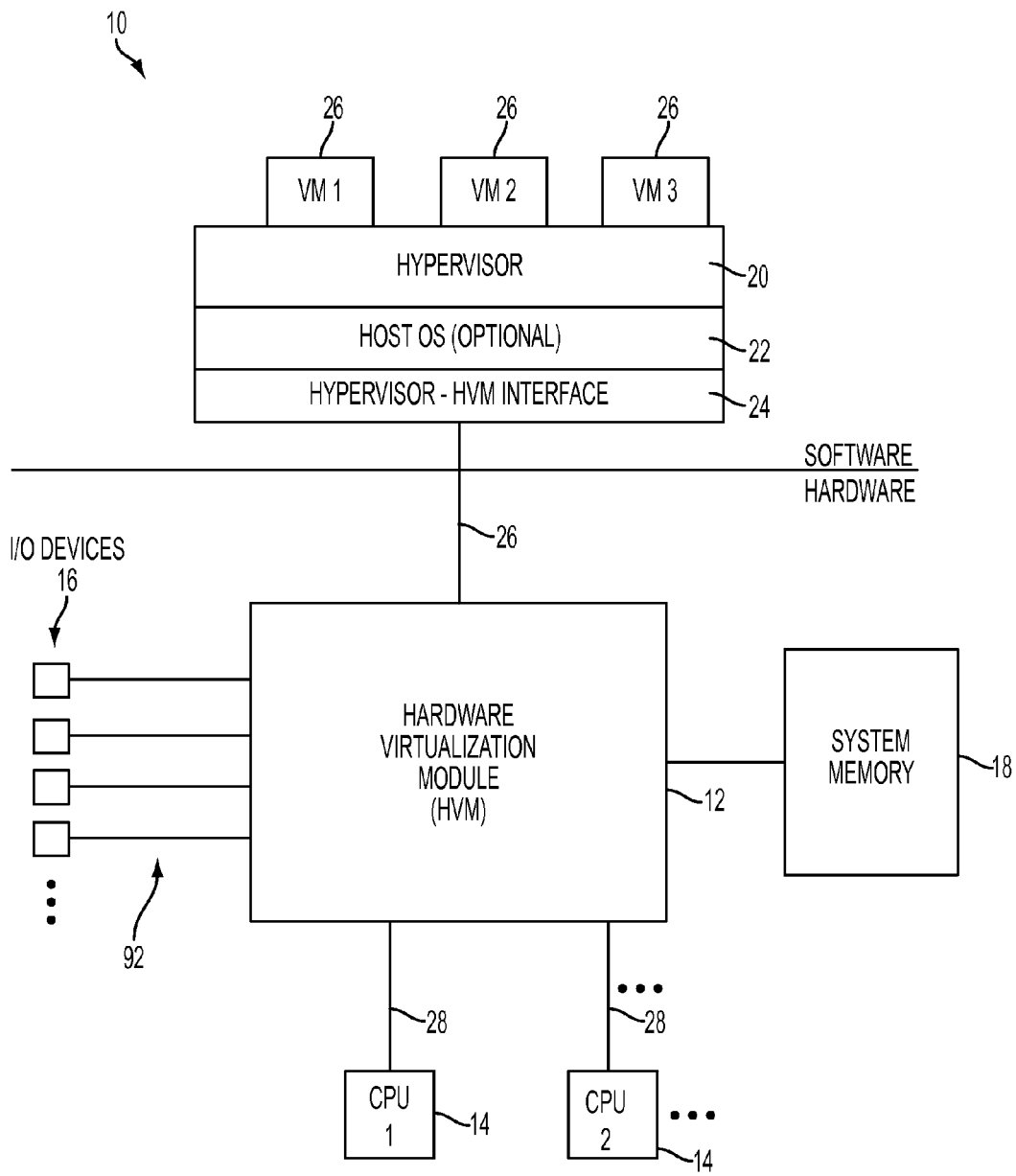
FIG. 1 illustrates an example computing system having an apparatus having exclusive access to one or more CPUs and host resources for controlled execution of a virtual machine, according to an example embodiment.

FIG. 1 illustrates an example computing system 10 having an apparatus 12 providing exclusive access to one or more CPUs 14 of the computing system 10, and exclusive access to host resources of the computing system 10, including I/O devices 16 and system memory 18. In other words, no hardware device (e.g., any CPU 14, any I/O device 16, or the system memory 18) can be accessed unless it is permitted access by the hardware-based apparatus 12, also referred to as a hardware virtualization module (HVM) 12. The I/O devices 16 can include one or more network interface circuits providing a network connection for network devices (e.g., network router devices, network switching devices, sensor nodes, etc.), directly connected host sensors, a keyboard interface, a Universal Serial Bus (USB) interface, a peripheral component interconnect (PCI) bus interface, etc. The I/O devices can be coupled to the HVM 12 by one or more I/O device connections 92.

The computing system 10 also can include software-based resources, for example a hypervisor 20, an optional host operating system (OS) 22, and a hypervisor-HVM interface 24. The hypervisor 20 can manage execution of virtual machines 26, also referred to as "tenant" virtual machines. The host OS 22 can be implemented in computing systems intended for interaction with users, although the host OS is not necessary in computing systems 10 not intended for user interactions, for example router devices configured for executing network operations in a local area network and/or wide area network.

The hypervisor-HVM interface 24 can be implemented as a "thin" layer of executable code overlying the hardware virtualization module 12. The hypervisor-HVM interface 24 can include executable primitives and virtual constructs of executable instructions intended for the CPUs 14, enabling the hypervisor 20 execute the management of the virtual machines 26 without the necessity of the host operating system 22 or direct access to the CPUs 14.

The hardware virtualization module (HVM) 12, implemented for example as a field programmable gate array (FPGA) and/or application-specific integrated circuit (ASIC) (described in further detail below), can send and receive messages 26 to and from the hypervisor-HVM interface 24 based on controlled execution of executable code under policies maintained exclusively by the HVM 12. In particular, the HVM 12 isolates the CPUs 14 and the hardware-based host resources 16, 18 from the virtualization provided by the hypervisor 20 and the virtual machines 26. The HVM 12 also can intercept all hardware and software interrupts, and selectively grant the interrupts based on prescribed policies maintained exclusively by the HVM 12, based on outputting corresponding commands to the appropriate CPU 14 via a system bus 28 providing a direct and exclusive connection between the HVM 12 and the corresponding CPU 14.

Prior virtualization techniques have always assumed that a CPU is a "trusted entity", such that I/O devices and memory devices often are directly connected to a CPU; hence, the execution of flawed or malicious software code by a CPU could cause possibly fatal errors in the system memory and/or I/O devices that are directly connected to the CPU, especially if the flawed or malicious software code can cause corruption of executable code and/or data nonvolatile memory; I/O devices connected to a CPU also could expose the CPU to attacks from network-based entities flooding the CPU with traffic (e.g., Denial of Service attacks). Concerns about security against flawed or malicious software code also arise in computing systems implemented as machine-to-machine (M2M) gateways that can be implemented as network router devices having built-in I/O ports for sending and receiving data between M2M assets such as sensors, actuators, human interface modules (HIM), etc.; such M2M anyways often can be used for factory automation, system monitoring and maintenance, closed loop control applications, etc. with increasing use on mobile vehicles such as maintenance/repair vehicles, cargo vehicles, or even passenger vehicles.

The example embodiments can guarantee that it is physically impossible for an outside agency to attack either any of the CPUs 14 or any of the host resources 16, 18, as the HVM 12 provides exclusive access to the CPUs 14 and the host resources 16 and 18: the HVM 12 can guarantee that access to any of the hardware components 14, 16 or 18 is impossible without the permission of the HVM 12 according to the prescribed policies maintained exclusively by the HVM 12.

Figure 2:
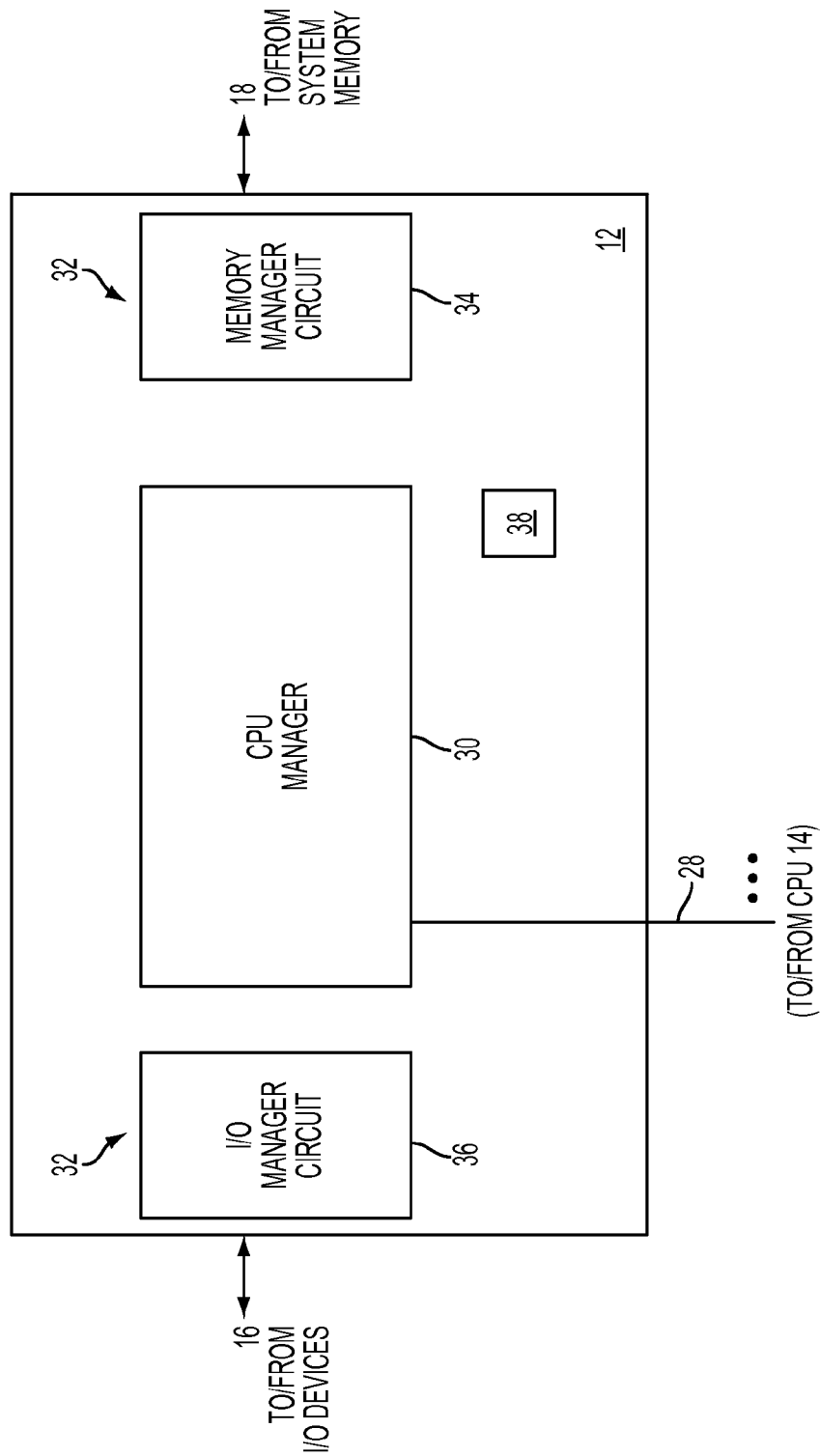
FIG. 2 illustrates the apparatus of FIG. 1, according to an example embodiment.

FIG. 2 illustrates in further detail the HVM 12 of FIG. 1, according to an example embodiment. The HVM 12 can include a CPU interface manager circuit 30, and a host interface manager circuit 32. The host interface manager circuit 32 can include a memory manager circuit 34 and an I/O manager circuit 36.

The CPU interface manager circuit 30 can be configured for providing exclusive access to each of one or more CPUs 14 of a computing system via a corresponding system bus 28. Each system bus 28 for a corresponding CPU 14 can include, for example, an address bus, a data bus, and timing/control signals including clock signals, interrupt signals, etc. The CPU interface manager circuit 30 can be configured for controlling execution of a virtual machine 26 based on the CPU manager circuit 30 controlling access to any CPU 14 or any host resource (e.g., any identifiable I/O device 16, any identifiable location in system memory 18) according to prescribed policies maintained exclusively by the HVM 12, including VM-specific policies for the virtual machine and/or global prescribed policies maintained by the HVM module 12. As described below with respect to FIG. 4, the CPU manager circuit 30 can be configured for scheduling a virtual machine (e.g., VM1) 26, relative to other virtual machines (e.g., VM2, VM3) 26 controlled by the HVM module 12, based on their respective policies for the respective virtual machines 26 and/or global prescribed policies. Example VM-specific policies can include priority and/or quality of service (QoS) values assigned to a virtual machine 26, congestion threshold conditions associated with a virtual machine 26 and/or an I/O device 16, etc.

The CPU manager circuit 30, in response to determining that a virtual machine (e.g., VM2) is to be executed (also referred to as an "active VM"), can send an instruction associated with the active VM to one or more CPUs 14 via the corresponding system bus 28. In response to receiving an I/O request from a CPU 14 during execution of an instruction for a virtual machine 26, the CPU manager circuit 30 can determine whether the request is compliant with the VM-specific and/or global policies maintained exclusively by the HVM 12. The I/O manager circuit 36 can determine whether the instruction executed with respect to the active virtual machine is authorized to access an identified I/O device 16, and selectively grant access based on determining the instruction is authorized to access the identified I/O device 16. Similarly, the memory manager circuit 34 can be configured for determining whether an instruction executed by a CPU 14 with respect to the active virtual machine is authorized to access an identified location in system memory 18, and either selectively grant access or deny access.

The HVM 12 also can include its own memory circuit 38 configured for storing prescribed VM-specific and/or global policies for the virtual machines 26, described in further detail below with respect to FIG. 3.

Figure 3:
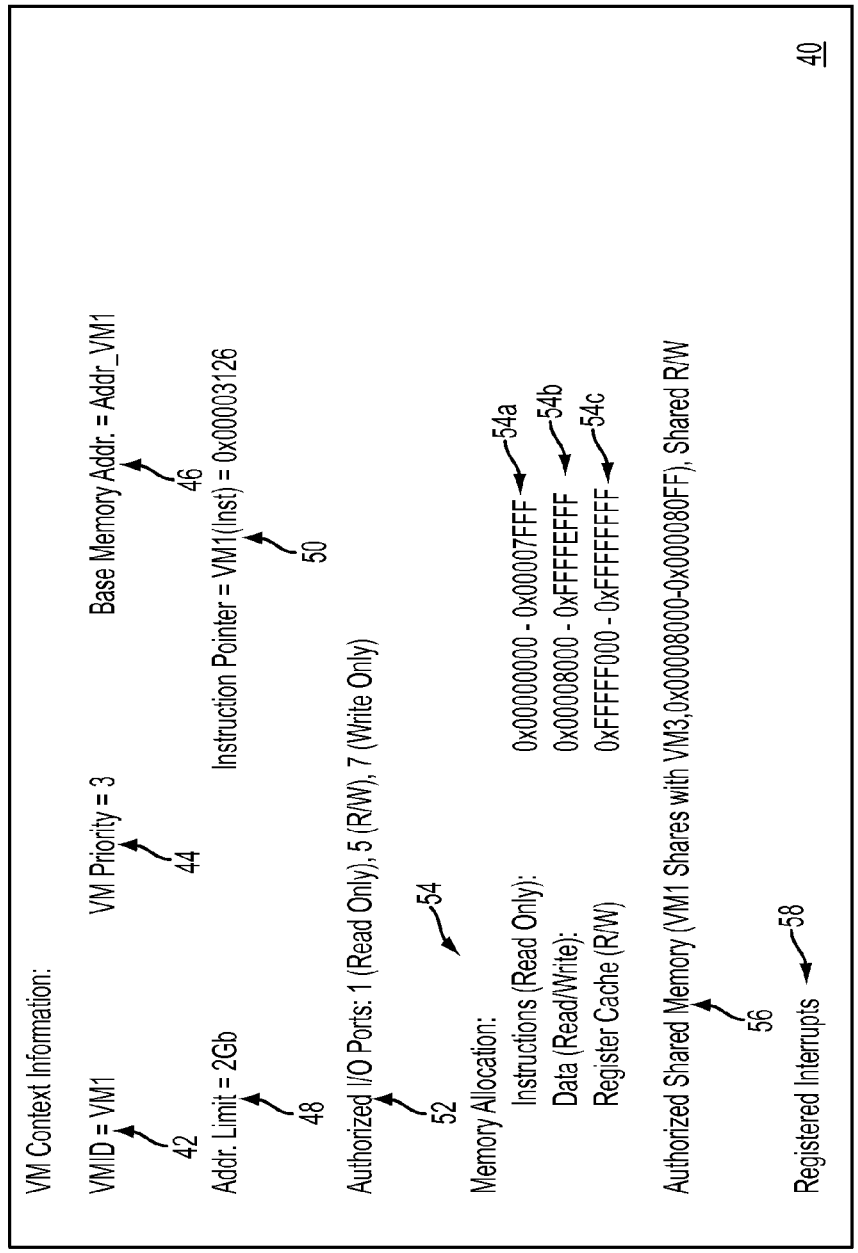
FIG. 3 illustrates example virtual machine attributes associated with controlled execution of a corresponding virtual machine by the apparatus of FIGS. 1 and 2, according to an example embodiment.

FIG. 3 illustrates example virtual machine attributes and policies 40, maintained exclusively by the HVM 12, for controlled execution of a corresponding virtual machine 26 by the HVM 12, according to an example embodiment. In one embodiment, the attributes and policies 40 can be stored exclusively within the memory circuit 38 of the HVM 12; in another embodiment, the attributes and policies 40 can be stored exclusively within the system memory 18 of FIG. 1; in another embodiment, the attributes and policies 40 can be stored in either the memory circuit 38 and/or the system memory 18, for example storing the corresponding policies 40 for at least the active VM (and optionally the next VM 26) in memory circuit 38, and the remaining in system memory 18.

The attributes and policies 40 maintained exclusively by the HVM 12 for a corresponding virtual machine 26 can include a virtual machine identifier 42, a virtual machine priority 44, a base memory address 46, a memory address limit 48, an instruction pointer 50, a list 52 of authorized I/O ports 16, a memory allocation list 54, a list of authorized share memory space 56, and a list of registered interrupt 58. The virtual machine identifier 42 can uniquely identify the corresponding virtual machine, illustrated for example as "VM1" as in FIG. 1. The virtual machine priority 44 can identify the relative priority of the corresponding virtual machine 26 relative to other virtual machines 26, enabling the CPU manager 32 implement priority-based (or quality of service based) scheduling of the virtual machines, described in further detail below with respect to FIG. 4. The base memory address 46 can identify a corresponding address offset ("Addr_VM1") in order to identify the starting address of a memory region 60 (illustrated in FIG. 5) allocated for the corresponding virtual machine 26, and the address limit 48 can specify the size of the memory region 60 allocated for the corresponding virtual machine 26. The address limit 48 can be the same value for all virtual machines such that all virtual machines have the same size memory region 60; alternately, the address limit 48 can be set at different values for different virtual machines 26, for example based on the corresponding priority 44; alternately, the address limit 48 can be set dynamically by the HVM 12, for example based on the number of virtual machines 26 that are being executed.

The instruction pointer 50 can identify a memory address location in system memory 18 (relative to the base memory address 46) for the next instruction to be executed by a CPU 14 for the corresponding virtual machine 26. The list 52 of authorized I/O ports can identify the I/O devices 16 that are accessible by the corresponding virtual machine 26, and can optionally include a specific memory address value that associates a prescribed address instruction with a corresponding authorized I/O device 16; hence, accessibility to I/O devices 16 can be established on a per instruction basis, as needed, such that a policy can be established that an I/O device 16 cannot be accessed unless the corresponding I/O port and associated memory address for the corresponding executable instruction is specified in the list 52. As illustrated in FIG. 3, the list 52 also can specify whether a given virtual machine 26 and/or specified instruction executed within the virtual machine 26 has read-only access, write only access, or read write (R/W) access. The memory allocation list 54 can specify prescribed allocations for the memory region 60 in system memory 18 for the corresponding virtual machine 26, including an instruction portion 54a for storing executable code for execution of the operations associated with the corresponding virtual machine "VM1" 26, a data portion 54b for storing data associated with the corresponding virtual machine "VM26", and a register cache portion 54c for storing data normally stored in CPU registers 14 (used for example to store instruction register values while another virtual machine is executed by the CPU 14).

The attributes and policies 40 also can include an authorized shared memory list 56 that can specify one or more memory address locations that can be shared with another virtual machine (e.g., "VM3") 26.

The attributes and policies 40 also can specify registered interrupts 58 that are registered as authorized interrupts during execution of the corresponding virtual machine "VM1" 26; hence, unauthorized interrupts by either an I/O device 16 and/or a CPU 28 can be ignored by the HVM 12.

Figure 4:
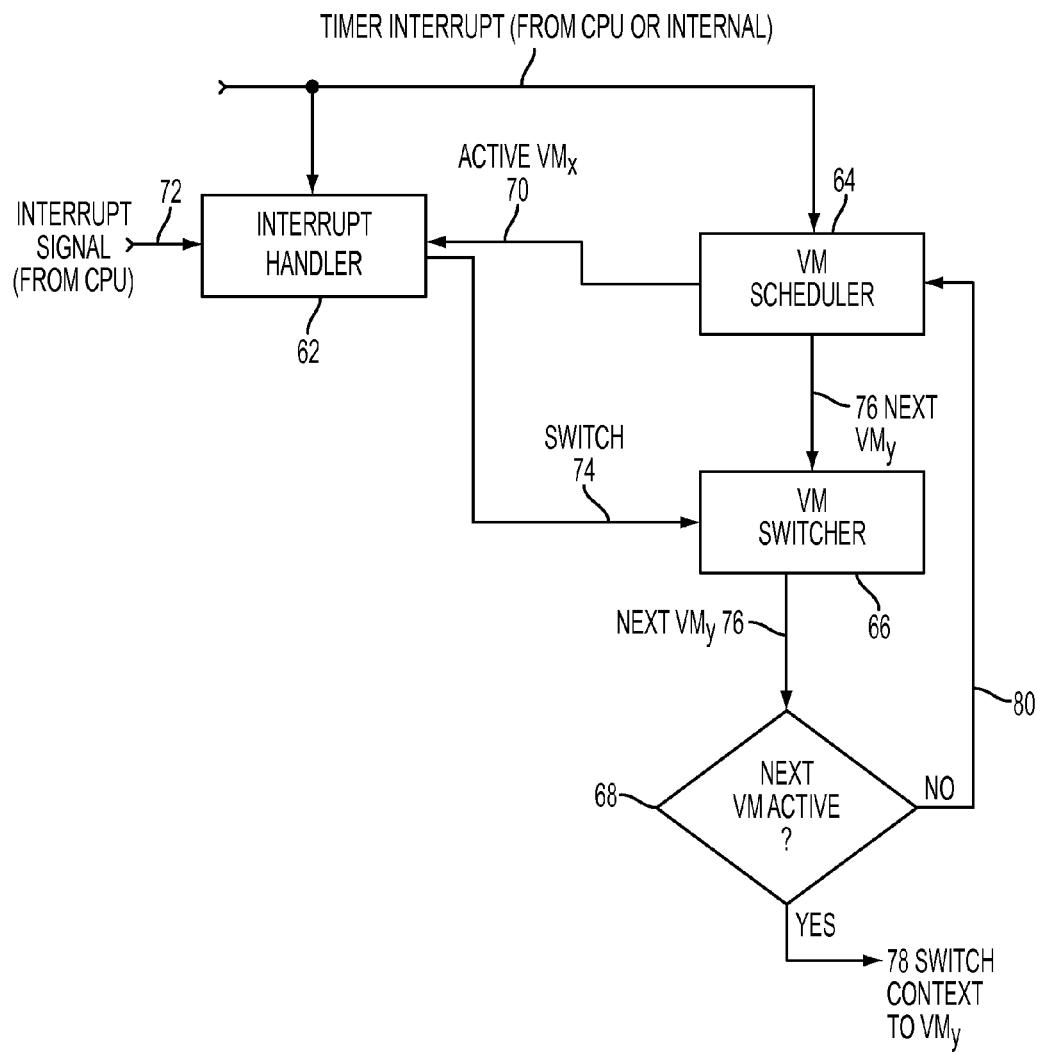
FIG. 4 illustrates an example CPU interface manager circuit, according to an example embodiment.

FIG. 4 illustrates an example of scheduling a virtual machine 26 by the CPU manager circuit 30 of FIG. 2, according to an example embodiment. The CPU manager circuit 30 can include an interrupt handler circuit 62, a VM scheduler circuit 64, a VM switcher circuit 66, and an active VM detector circuit 68. The interrupt handler circuit 62 can receive one or more interrupt signals 72 for example from one of the CPUs 14, from an I/O device 16, etc. The interrupt handler circuit 62 and the VM scheduler circuit 64 each can receive a timer interrupt, for example indicating expiration of a prescribed time interval allocated for execution of a corresponding virtual machine 26 (e.g., 1 second). The interrupt handler circuit 62 also can receive an identification 70 of the currently active virtual machine "Active VMx", and in response determine whether a received interrupt signal 72 should be processed relative to the prescribed policies maintained for the corresponding active virtual machine 70, for example based on the registered interrupts 58 of FIG. 3. Hence, the interrupt handler circuit 62 can either respond to the interrupt 72 by outputting a switch command 74, or ignoring the interrupt signal 72, based on the corresponding policies 40 as specified for example in the registered interrupts 58. The virtual machine scheduler circuit 64 can schedule the next virtual machine to be executed "Next VMy" 76, for example based on the timer interrupt and the queue of virtual machines relative to the respective priorities 44, etc. The VM switcher circuit 66 can respond to the switch signal 74 by supplying the next virtual machine identifier 76 to the active VM detector circuit 68: the active VM detector circuit 68 can output a switching command 78 in response to determining the next virtual machine "VMy" 76 is active; the active VM detector circuit 68 also can output a VM increment signal 80 to the VM scheduler circuit 64 in response to detecting that the next virtual machine "VMy" is idle and not active.

Hence, the CPU manager circuit 30 can schedule a virtual machine 26, relative to other virtual machines, based on the respective policies 44 for the respective virtual machines 26, including the corresponding priority 44 assigned to each virtual machine 26, and further based on whether the corresponding virtual machine 26 is active or idle.

Figure 5:
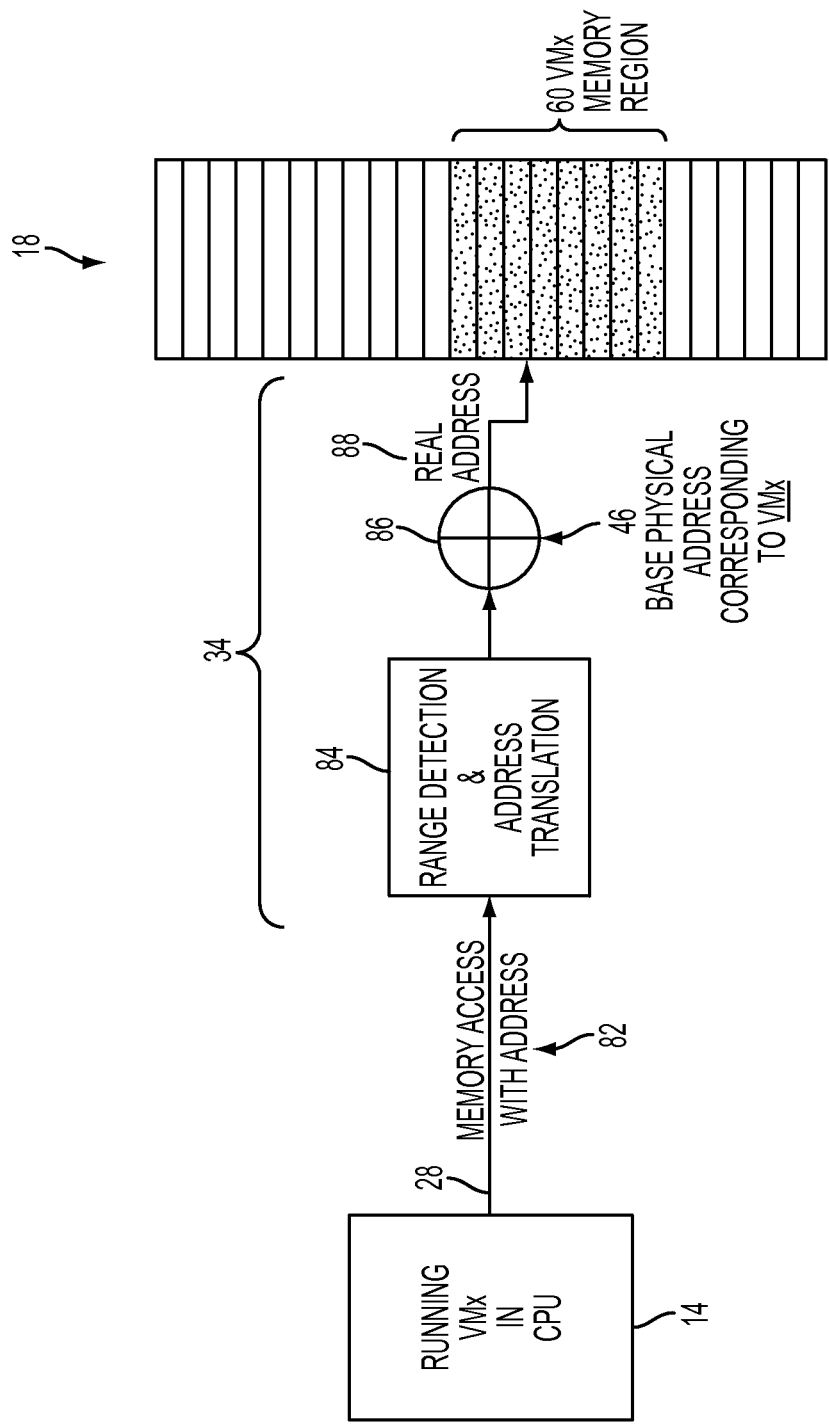
FIG. 5 illustrates an example memory manager circuit, according to an example embodiment.

FIG. 5 illustrates operations associated with the memory management circuit 34, according to an example embodiment. In response to the CPU manager circuit 30 receiving in operation 82 the memory access request for a specified memory address, the memory manager circuit 34 in operation 84 can execute a range detection and address translation relative to the base memory address 46, the address limit 48, and the memory allocation 54. If in operation 84 the memory manager circuit 34 determines that the memory access request from the CPU 14 complies with the VM policies 40, the memory manager circuit 34 can authorize the memory access based on adding in operation 86 the base physical address 46 for the corresponding virtual machine 26 to obtain the physical address 88 for reaching the requested memory address within the system memory 18. If in operation 84 the memory manager circuit 34 determines that the memory access request does not comply with the corresponding policies 40, the memory access can be denied, for example based on returning an error interrupt, an error flag, or null data.

Figure 6:
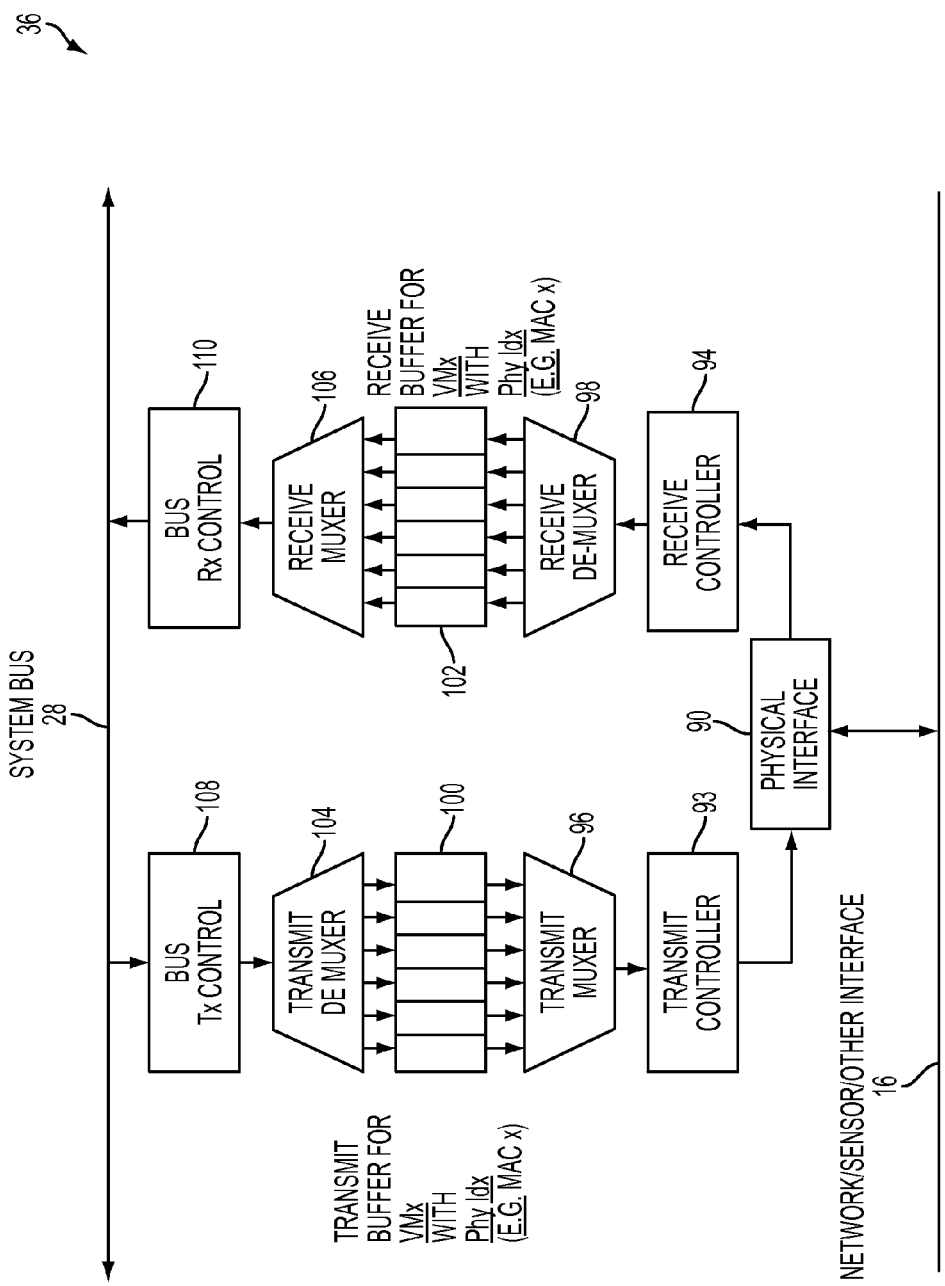
FIG. 6 illustrates an example Input/Output (I/O) manager circuit, according to an example embodiment.

FIG. 6 illustrates an example I/O manager circuit 36, according to an example embodiment. The I/O manager circuit 36 can include a physical interface 90 coupled to one or more I/O devices 16 via one or more I/O connections (92 of FIG. 1). The I/O manager circuit 36 also can include a transmit controller 93, a receive controller 94, a transmit multiplexer 96, a receive demultiplexer 98, virtual machine transmit buffers 100, virtual machine receive buffers 102, a transmit demultiplexer 104, a receive multiplexer 106, a bus transmit controller circuit 108, and a bus receive controller circuit 110. The I/O manager circuit 36, under the control of the CPU manager circuit 30, can selectively send data between an I/O device 16 and a CPU 14 based on the corresponding prescribed policies 40 for the corresponding virtual machine 26, and based on prescribed congestion conditions established and maintained by the HVM 12.

The transmit controller circuit 108 of the I/O manager circuit 36 is configured for determining whether a CPU 14 is authorized to access an identified I/O device 16 during execution of an identified destination for a corresponding virtual machine 26, based on the corresponding policies 40. In response to determining the CPU 14 is authorized to access the identified I/O device 16, the transmit controller circuit 108 can selectively grant access to the identified I/O device 16 based on causing the transmit demultiplexer circuit 104 to store the access request in the appropriate first-in first-out buffer circuit 100 for the corresponding virtual machine 26. In particular, each virtual machine 26 has a corresponding transmit buffer 100 and receive buffer 102 for each registered I/O device 16, with associated congestion policies enforced by the I/O manager circuit 36; hence, if the I/O manager circuit 36 detects an overflow condition in any transmit buffer 100 (e.g., due to an attack by a rogue virtual machine toward an I/O device 16) or receive buffer 102 (e.g., due to an attack by a rogue I/O device 16), the I/O manager circuit 36 can implement corrective action, for example drop overflowing data, flush the congested buffer 100 or 102, etc. The transmit multiplexer circuit 96 can output a queued instruction from the transmit buffer (for a registered I/O device 16), enabling the transmit controller 93 to output the instruction to the destination I/O device 16 for execution of the corresponding I/O operation on behalf of the active virtual machine 26.

Similar to the transmit flow of instructions from the CPU 14 to an identified I/O device 16, the receive controller circuit 94 is configured for determining whether an I/O device 16 is authorized to access the CPU based on the corresponding policies 40 for the active virtual machine 26. Assuming an I/O device 16 is authorized to access the CPU for the associated virtual machine 26, the receive demultiplexer 98 can store the received instruction (e.g., a received data packet, sensor message, PCI data frame, etc.) in the appropriate receive buffer 102 associated with the I/O device 16 for the active virtual machine 26. As described previously, the I/O manager circuit 36 can monitor the receive buffer 102 for congestion conditions and drop any instructions creating a congestion condition, in order to provide additional security against attacks such as denial of service attacks. The receive multiplexer circuit 106 can output a queued instruction from the receive buffer 102, enabling the receive controller circuit 110 to output the instruction (e.g., data packet) from the registered I/O device 16 onto the system bus 28 for execution by the CPU 14 according to the processing of the active virtual machine 26.

Figure 7:
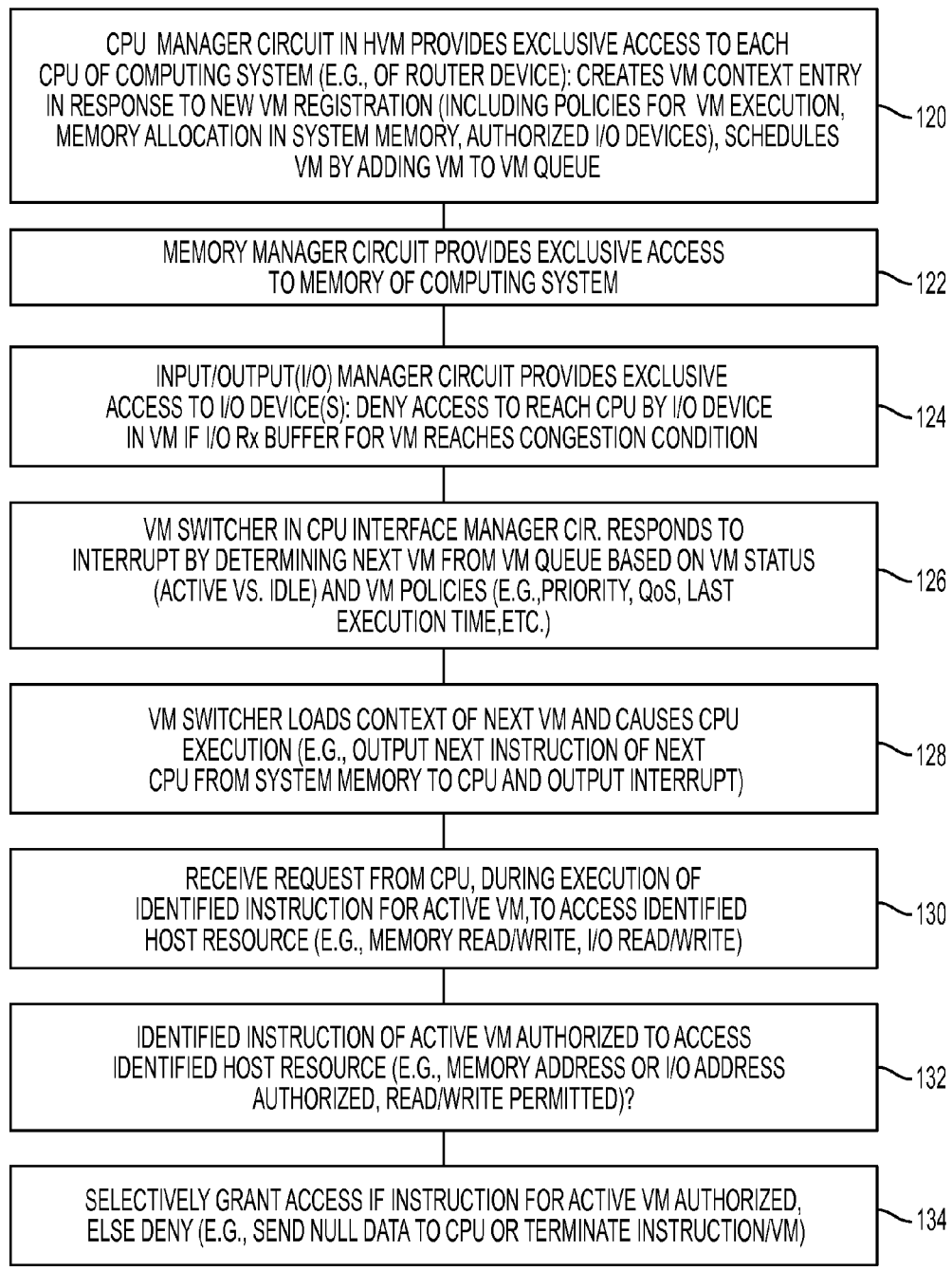
FIG. 7 illustrates an example method of the apparatus of FIG. 1 executing controlled execution of a virtual machine, according to an example embodiment.

FIG. 7 illustrates an example method by the HVM 12 executing controlled execution of a virtual machine 26, according to an example embodiment.

As described previously, the CPU manager circuit 30 in the HVM 12 provides exclusive access to each CPU 28 of the computing system 10, where the computing system 10 can be implemented for example as a router device in a computing network. The CPU manager circuit 30 in operation 120 can create a virtual machine context entry 40 in response to a new virtual machine registration for a corresponding virtual machine 26. The VM context entry 40 can include policies for virtual machine execution (e.g., 44, 56, 58), memory allocation (e.g., 46, 48, 54 of FIG. 3) in the system memory 18, a listing 52 of authorized I/O devices 16, etc. The CPU manager circuit 30 in operation 120 also can schedule the virtual machine 26 by adding the VM identifier 42 to the VM queue maintained by the VM scheduler circuit 64. As described previously, the memory manager circuit 34 in operation 122 provides exclusive access to the system memory 18 of the computing system 10, and the I/O manager circuit 36 in operation 124 provides exclusive access to the I/O devices 16 via I/O device connections 92 (e.g., individual connections, I/O buses, etc.). The I/O manager circuit 36 also in operation 124 can deny access by an I/O device 16 attempting to reach any CPU 14 executing a prescribed virtual machine 26 if the corresponding receive buffer 102 of FIG. 6 reaches a congestion condition.

In operation 126 the VM switcher circuit 66 in the CPU manager circuit 30 can respond to an interrupt signal 72 (or timer interrupt) by determining the next virtual machine 76 based on the active status (68 of FIG. 4), and the above-describe policies (62, 64 of FIG. 4). The VM switcher circuit 66 and active virtual machine detector circuit 68 in operation 128 can cause the context of the next virtual machine 78 to be executed by the CPU 14, for example based on outputting the next instruction specified by the instruction pointer 50 from the system memory 18 to an address bus on the system bus 20, and outputting an interrupt signal on the system bus 28.

In response to receiving in operation 130 a CPU request for an I/O access during execution of an identified destination for the active virtual machine 26, the CPU manager circuit 30 can determine in operation 132 whether the identified instruction of the active virtual machine 26 is authorized to access the identified host resource (e.g., the specified memory address in system memory 18, or the specified I/O address of an I/O device 16). The CPU manager circuit 30 in operation 134 can selectively grant access for the active virtual machine executed by the CPU 14 based on determining the corresponding request is authorized according to the policies 40; as described previously, the CPU manager circuit 30 also can deny the access request by the CPU 14 if the access request violates the corresponding policies 44 the virtual machine 26, for example by sending null data were terminating the instruction, or in severe cases terminating the instance of the virtual machine 26.

According to example embodiments, a hardware virtualization module enables hardware-based monitoring of virtual machines, implemented for example as M2M embedded virtual machines. The hardware-based isolation of the virtual machines from the CPU provides strong security against local and external attacks, including preventing seizure of control of virtual machine scheduling or CPU cycles, preventing tampering of system memory, preventing flooding-type attacks such as denial of service attacks, etc. Hence, the example embodiments provide a reliable and secure apparatus that can manage the virtualization needs of guest virtual machines. Further, the example embodiments also enable a CPU manufactured by any processor vendor to be utilized, including CPU cores that do not support virtualization.

Any of the disclosed circuits HVM module 12 be implemented in hardware using different manufacturing techniques. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). As specified, the HVM 12 is implemented in hardware, and therefore is not implemented using a software-based executable resource that is executed by a corresponding internal processor circuit such as a microprocessor circuit. Hence, use of the term "circuit" in this specification refers solely to a hardware-based circuit implemented using one or more integrated circuits and that includes logic for performing the described operations.

The operations described in any of the FIGS. 1-7 can be implemented as executable code stored on a machine readable non-transitory tangible storage medium in the HVM 12 (e.g., ROM, EEPROM, nonvolatile RAM, etc.) that are completed based on execution of the code by a machine implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.) by a machine comprising integrated circuits.

In addition, the operations described with respect to any of the FIGS. 1-7 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
providing an apparatus having exclusive access to each of one or more central processing units (CPUs) of a computing system and exclusive access to host resources of the computing system;
controlling, by the apparatus, execution of a virtual machine in the computing system based on the apparatus controlling access to any one of the CPUs or any one of the host resources according to prescribed policies for the virtual machine, the prescribed policies maintained exclusively by the apparatus.

2. The method of claim 1, wherein the controlling according to the prescribed policies includes the apparatus controlling access to any host resource by any one CPU during execution of the virtual machine, or controlling access to any CPU by any host resource, the host resources including any Input/Output (I/O) device of the computing system, or any memory of the computing system.

3. The method of claim 2, wherein the controlling further comprises determining, by the apparatus, whether the CPU is authorized to access an identified memory location during execution of an identified instruction for the virtual machine, and selectively granting the access based on determining the CPU is authorized.

4. The method of claim 3, wherein the controlling further comprises determining, by the apparatus, whether the CPU is authorized to access an identified I/O device of the computing system during execution of an second identified instruction for the virtual machine, and selectively granting the access to the identified I/O device based on determining the CPU is authorized.

5. The method of claim 3, wherein the controlling further comprises the apparatus denying an identified I/O device access to the CPU based on determining the identified I/O device is creating a congestion condition during execution of the virtual machine.

6. The method of claim 1, wherein the controlling includes the apparatus scheduling the virtual machine, relative to other virtual machines controlled by the apparatus, based on the respective policies for the respective virtual machines, including a corresponding priority assigned to each virtual machine.

7. The method of claim 6, wherein each virtual machine has a corresponding policy, enforced by the apparatus, for accessing to any one CPU, or any host resource including any Input/Output (I/O) device of the computing system or any memory of the computing system.

8. An apparatus comprising:
at least one central processing unit (CPU) interface manager circuit configured for providing exclusive access to each of one or more CPUs of a computing system; and
at least one host interface manager circuit configured for providing exclusive access to host resources of the computing system;
the CPU interface manager circuit configured for controlling execution of a virtual machine in the computing system based on the apparatus controlling access to any one of the CPUs or any one of the host resources according to prescribed policies for the virtual machine, the prescribed policies maintained exclusively by the apparatus.

9. The apparatus of claim 8, wherein:
the host interface manager circuit is configured for controlling, according to the prescribed policies, access to any host resource by any one CPU during execution of the virtual machine;
the CPU interface manager circuit configured for controlling access to any CPU by any host resource, the host resources including any Input/Output (I/O) device of the computing system, or any memory of the computing system.

10. The apparatus of claim 9, wherein the host interface manager circuit comprises a memory manager circuit configured for determining whether the CPU is authorized to access an identified memory location during execution of an identified instruction for the virtual machine, and selectively granting the access based on determining the CPU is authorized.

11. The apparatus of claim 10, wherein the host interface manager circuit further comprises an I/O manager circuit configured for determining whether the CPU is authorized to access an identified I/O device of the computing system during execution of an second identified instruction for the virtual machine, and selectively granting the access to the identified I/O device based on determining the CPU is authorized.

12. The apparatus of claim 10, wherein the I/O manager circuit is configured for denying an identified I/O device access to the CPU based on determining the identified I/O device is creating a congestion condition during execution of the virtual machine.

13. The apparatus of claim 8, wherein the CPU interface manager circuit is configured for scheduling the virtual machine, relative to other virtual machines controlled by the apparatus, based on the respective policies for the respective virtual machines, including a corresponding priority assigned to each virtual machine.

14. The apparatus of claim 13, wherein each virtual machine has a corresponding policy, enforced by the apparatus, for accessing to any one CPU, or any host resource including any Input/Output (I/O) device of the computing system or any memory of the computing system.

15. Logic encoded in one or more non-transitory tangible media for execution by a machine and when executed by the machine operable for:
- providing the machine with exclusive access to each of one or more central processing units (CPUs) of a computing system and exclusive access to host resources of the computing system;
- controlling, by the machine, execution of a virtual machine in the computing system based on the machine controlling access to any one of the CPUs or any one of the host resources according to prescribed policies for the virtual machine, the prescribed policies maintained exclusively by the machine.

16. The logic of claim 15, wherein the controlling according to the prescribed policies includes the machine controlling access to any host resource by any one CPU during execution of the virtual machine, or controlling access to any CPU by any host resource, the host resources including any Input/Output (I/O) device of the computing system, or any memory of the computing system.

17. The logic of claim 16, wherein the controlling further comprises determining, by the machine, whether the CPU is authorized to access an identified memory location during execution of an identified instruction for the virtual machine, and selectively granting the access based on determining the CPU is authorized.

18. The logic of claim 17, wherein the controlling further comprises determining, by the machine, whether the CPU is authorized to access an identified I/O device of the computing system during execution of an second identified instruction for the virtual machine, and selectively granting the access to the identified I/O device based on determining the CPU is authorized.

19. The logic of claim 17, wherein the controlling further comprises the machine denying an identified I/O device access to the CPU based on determining the identified I/O device is creating a congestion condition during execution of the virtual machine.

20. The logic of claim 15, wherein the controlling includes the machine scheduling the virtual machine, relative to other virtual machines controlled by the machine, based on the respective policies for the respective virtual machines, including a corresponding priority assigned to each virtual machine.

* * * * *